United States Patent [19]

Warner et al.

[11] Patent Number: 4,501,513

[45] Date of Patent: Feb. 26, 1985

[54] METHOD AND APPARATUS FOR FORMING A HEAT EXCHANGE SYSTEM IN THE EARTH

[76] Inventors: Bert J. Warner; Joe F. Warner, both of 504 Towncreek Dr., Dallas, Tex. 75232

[21] Appl. No.: 308,862

[22] Filed: Oct. 5, 1981

[51] Int. Cl.³ .............................................. F16L 1/02
[52] U.S. Cl. ..................................... 405/184; 165/45; 175/61
[58] Field of Search ................ 405/50, 130, 131, 157, 405/179, 184; 165/45; 166/278; 175/53, 61, 67

[56] References Cited

U.S. PATENT DOCUMENTS

| | | |
|---|---|---|
| 462,179 | 10/1891 | Turley et al. |
| 2,217,190 | 10/1940 | Urquhart . |
| 2,251,916 | 8/1941 | Cross . |
| 3,720,272 | 3/1973 | Hunter ................................. 175/61 |
| 4,062,196 | 12/1977 | Yoshida et al. . |
| 4,091,631 | 5/1978 | Cherrington ........................ 405/184 |
| 4,135,586 | 1/1979 | Cherrington . |
| 4,258,780 | 3/1981 | Suo . |
| 4,267,881 | 5/1981 | Byerly ................................. 165/45 |
| 4,279,291 | 7/1981 | Lambert ........................... 165/45 X |
| 4,384,624 | 5/1983 | Duke et al. ...................... 405/184 X |

FOREIGN PATENT DOCUMENTS 514673  12/1930  Fed. Rep. of Germany ........ 165/45

Primary Examiner—David H. Corbin

[57] ABSTRACT

A method and apparatus for forming a heat exchange system in the earth. A curve hole is formed in the earth having a substantially constant radius of curvature and is cased to form a cased flowpath therethrough. The apparatus used for forming the hole is comprised of a trailer having a frame on which a plurality of drill pipe supports are pivotably mounted. A curve drill pipe is supported by said supports and is connected at one end to a pressurized drilling fluid source. The pipe is fed into the earth and the fluid exiting from the leading end cuts a hole in advance of the pipe. When the pipe has been fed completely through the earth and the leading end breaks the surface, the fluid is stopped and a casing is connected through an adaptor to the leading end of the pipe. The pipe is then withdrawn through the hole to draw the casing through the hole. The annulus between the casing and the hole is filled with a particulate heat conductive material as the pipe is withdrawn.

18 Claims, 9 Drawing Figures

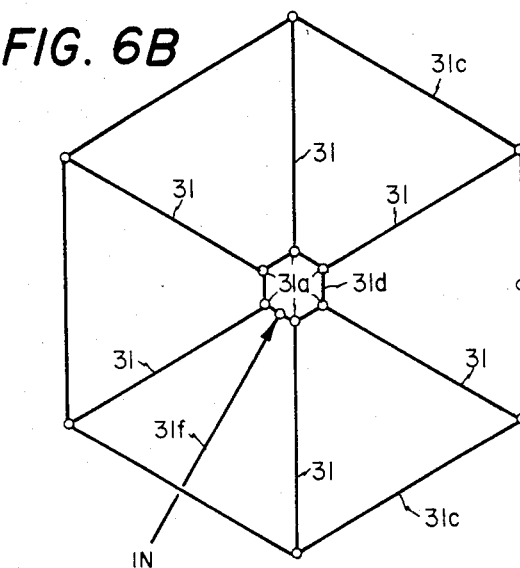
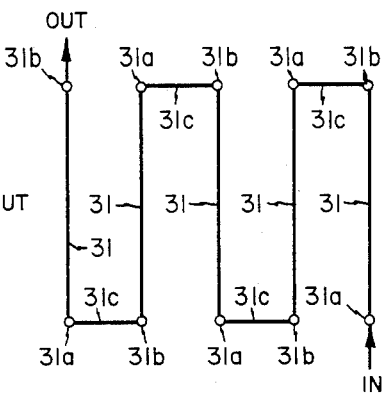
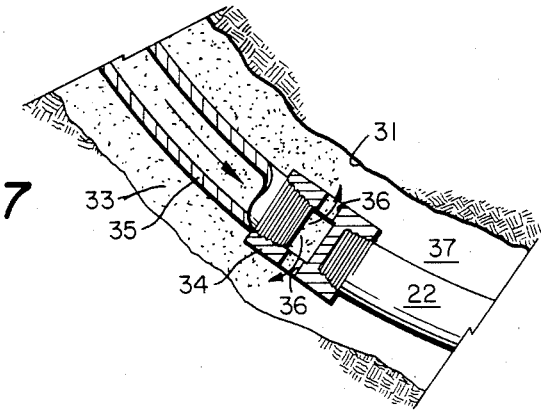
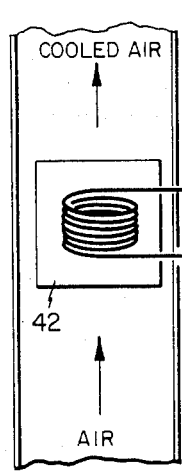

METHOD AND APPARATUS FOR FORMING A HEAT EXCHANGE SYSTEM IN THE EARTH

BACKGROUND OF THE INVENTION

The present invention relates to systems which use the earth as a heat exchange media and more particularly relates to method and apparatus for forming a heat exchange system within the earth.

Most conventional, present day air conditioning systems used for heating and/or cooling buildings or like areas require relatively large amounts of energy (e.g. electricity and/or gas) to maintain the conditioned environment at a comfortable temperature. Recently, due to conservation efforts and increased energy costs, users have had to adjust their thermostats and operate their systems at less than desirable temperatures. This has resulted in a search for new developments and/or improvements in conventional air conditioning systems whereby the efficiency of a system can be increased at low initial capital costs but which will produce substantially lower operating costs in maintaining temperatures at more desirable levels throughout the year.

One promising approach for improving the efficiency of conventional air conditioning systems involves using the earth or ground, itself, as a heat exchange media for the fluids that are circulated through the air conditioner system. As known, the earth provides a very compact source or sink for heat. It has been calculated that a cylinder of earth 30 feet in diameter and 100 feet in depth can, by changing its temperature only 10° F., source or sink up to 28 million Btu's of heat. This amount of heat exchange is enough for a five-month heating or cooling season wherein a heat pump system is operated 30 percent of the time at a rate of 30,000 Btu's per hour. Further, whereas ambient surface temperatures may vary as much as 80° F. throughout the year, ground (earth) temperature at a depth of 6 feet varies only 20° F. during the same period thereby maintaining a relatively constant temperature over long periods of time.

Several techniques have been proposed for accessing this heat exchange capability of the earth. One such technique involves installing a U shaped tubing in a substantially vertical wellbore that has been drilled into the earth. The well is filled with water to thermally couple the tubing to the earth surrounding the wellbore. Heat can then be exchanged between the earth and a fluid that is continuously circulated through the tubing. However, if the legs of the U-tubing are too close to each other, they, too, will be thermally coupled by the water in the well thereby seriously affecting the efficiency of the system. To overcome this problem, the wellbore, itself, has to have a large diameter and be very deep thereby making this heat exchange system relatively expensive to install.

Another known technique of accessing the heat exchange capacity of the earth involves installing a grid of pipes into trenches or ditches that are dug in the surface of the earth. The pipes are connected to form a continuous flowpath for a fluid which is to be heat exchanged with the earth. Unfortunately, the flowpath of this system can only substantially collect or reject heat in a flat plane downward into the earth thereby reducing its potential effectiveness by half. To increase the efficiency of such a system, the pipe grid would have to be buried substantially deeper in the earth or cover a large surface area, again substantially adding to the initial cost of installation of the system.

Therefore, it is believed that for the majority of present day air conditioner users to readily accept an earth heat exchange system as a means for increasing the efficiency of their air conditioning units and thereby reduce their operating costs, the initial cost for installing the earth heat exchange system must be considered relatively inexpensive when compared to the utlimate savings in the energy costs for operation.

SUMMARY OF THE INVENTION

The present invention provides a method and apparatus for quickly and economically forming a heat exchange system in the earth of the type which can be used to exchange heat to or from fluids, e.g. Freon, which are normally circulated through conventional air conditioning systems.

More specifically, a curved hole is formed in the earth which has a substantially constant radius of curvature and which has both ends open to the surface. This hole is cased throughout its entire length to provide a cased flowpath therethrough. A plurality of these curved holes may be formed and cased and connected together in various patterns to provide sufficient contact area between the flowpath of the heat exchange system and the earth so that fluids from an air conditioning system when circuated through said flowpath will undergo the desired heat exchange with the earth.

The apparatus of the present invention used in forming said hole in the earth comprises a frame having a plurality of drill pipe supports pivotably mounted about a common axis on said frame. Preferably, the frame has a tongue and wheels thereon thereby making it a self-contained trailer capable of being easily moved from site to site. Each of said supports has a guide means on the outer ends thereof adapted to receive and support a curved drill pipe.

Means are provided on the trailing end of the drill pipe for connecting the drill pipe to a source of pressurized drilling fluid, e.g. water at 200 psi or higher pressure. As this pressurized fluid is flowed through the drill pipe and out the leading end thereof, the leading end of the pipe is fed into the ground where the jet of fluid exiting the pipe cuts a hole in the ground ahead of the advancing drill pipe. The curved drill pipe is fed into the ground until it has completed a curved path through the earth and the leading end thereof breaks through the surface.

The drilling fluid is then stopped and a length of casing, e.g. flexible PVC pipe or copper tubing or the like, is attached through an adaptor to the exposed leading end of the drill pipe. The drill pipe is then withdrawn back through the drilled hole thereby drawing the casing into and through the hole to thereby case same. Preferably, the annulus formed between the casing and the hole is filled with a particulate heat conductive material, e.g. sand, as the drill pipe is being withdrawn by pumping the material through the casing and out into the annulus through the adaptor. To further insure good thermal connection between the casing and the earth, the heat conductive material in the annulus is saturated as required with a heat conductive liquid, e.g. water, which is fed through a tubing attached to the casing.

BRIEF DESCRIPTION OF THE DRAWINGS

The actual construction, operation, and the apparent advantages of the present invention will be better understood by referring to the drawings in which like numerals identify like parts and in which:

FIG. 3 is a perspective view, partly broken away, of the guide means on the apparatus of FIG. 1 through which the leading end of the drill pipe is initially positioned;

FIG. 4 is a perspective view, partly broken away, of a drill pipe guide means on the outer end of a support of the apparatus of FIG. 1;

FIG. 6A is a plan view of a heat exchange system having holes laid out in a first pattern in the earth;

FIG. 6B is a plan view of a heat exchange system having holes laid out in a second pattern in the earth;

FIG. 7 is a sectional view of an adaptor used in the present invention; and

FIG. 8 is a schematical view of a typical air conditioning system in conjunction with the heat exchange system of the present invention.

DESCRIPTION OF THE PREFERRED EMBODIMENTS

Figure 1:
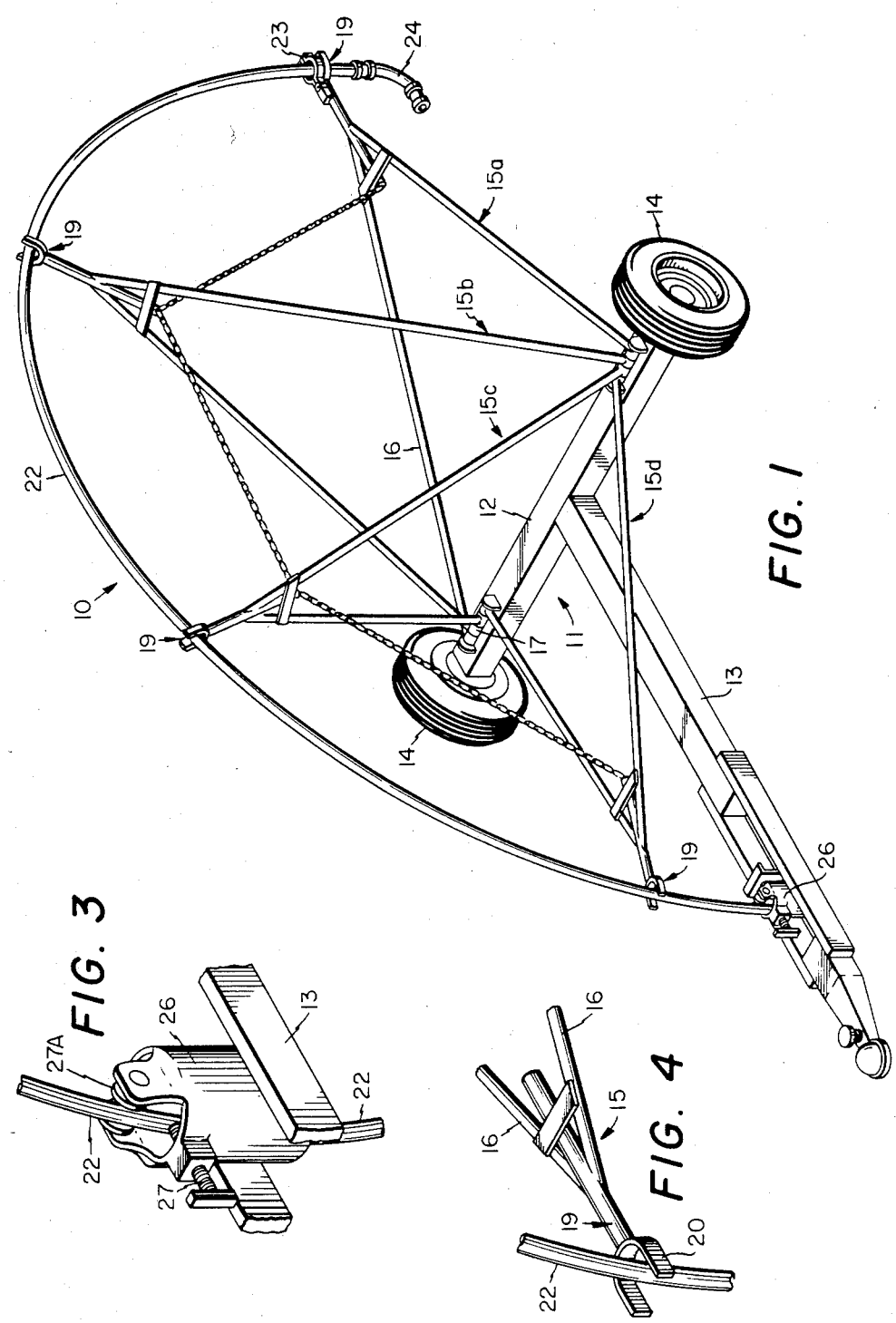
FIG. 1 is a perspective view of the apparatus of the present invention.
Figure 2:
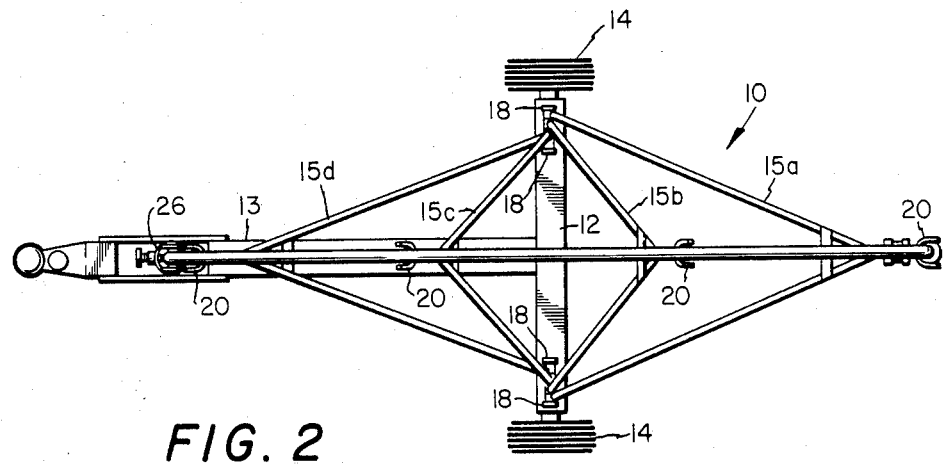
FIG. 2 is a plan view of the apparatus of FIG. 1.

Referring more particularly to the drawings, FIGS. 1 and 2 disclose drilling apparatus 10 of the present invention which can be used to install the heat exchange system of the present invention. Apparatus 10 is comprised of a portable frame 11 having a cross member 12 and an elongated member or tongue 13 secured to one side of the cross member. Preferably, as illustrated, wheels (e.g. boat trailer tires) 14 are mounted on axles at either end of cross member 12 so that apparatus 10 is effectively a selfcontained trailer which can be easily towed by most commercially available vehicles. Of course, frame 11 can function without wheels and could be transported by separate trailer or vehicle without affecting the present invention.

Pivotably mounted on frame 11 are a plurality of drill pipe support members 15a-d, (four shown). As illustrated, each support is comprised of two tubular legs 16 (FIGS. 1 and 4) joined together at their outer ends to form a triangular-shaped support. Each leg 16 has a hub 17 on its inner end which is rotatably mounted to a respective end of cross-member 12 by means of a pin or axle which extends between blocks 18 (FIG. 2) which in turn are secured to cross member 12. As seen in FIGS. 1 and 2, supports 15a-d are sized so that the hubs 17 of support 15d lies inside the hubs of support 15c which in turn lie inside of the hubs of support 15b which lie inside the hubs of support 15a whereby all of the supports pivot or rotate about a common axis.

Secured to the outer end of each support 15 is a guide means 19 which has a U-shaped guide 20 thereon, the purpose of which will be described below. Further each support 15 is sized so that guide 20 on each support is approximately the same distance from frame 11 so that all of guides 20 will move along the same common circular path when the supports are rotated about their common axis. Each support 15 is connected to an adjacent support by flexible means 21 (e.g. a length of chain) which limits movement in one direction between two adjacent supports but allows the supports to move into abutment with each other when moved in the other direction.

Positioned in the U-shaped guides 20 on supports 15 is rigid drill pipe 22 (e.g. ½ inch O.D. steel pipe) which is formed in a permanent curve having a substantially constant radius of curvature. Although drill pipe 22 is supported by supports 15, it is free for relative movement through guides 20 on supports 15b, 15c, 15d. The trailing end of drill pipe 22 is secured against movement in guide 20 on support 15d (FIG. 1) by means of clamp 23 or the like. The trailing end of drill pipe 22 has a coupling 24 thereon which is adapted to be connected to a flexible, high pressure hose 25 (FIG. 5) which in turn is connected to a pressurized fluid source (not shown). Preferably, this source is comprised of a small pump driven by a small engine or motor which boosts the pressure of a conventional municipal water supply.

The leading or drilling end of drill pipe 22 is positioned through guide 26 (FIG. 3) which is secured in an opening in tongue 13. A free-wheeling roller 27a is mounted in guide 26 to aid in feeding drill pipe 22 therethrough. Bolt 27 is threaded through guide 26 and is used to clamp pipe 22 in a fixed position in guide 26 for transport or when apparatus 10 is not in use. With the structure of apparatus 10 having now been described, the operation thereof and how it is used in forming a heat exchange system in the earth will now be set forth.

Figure 5:
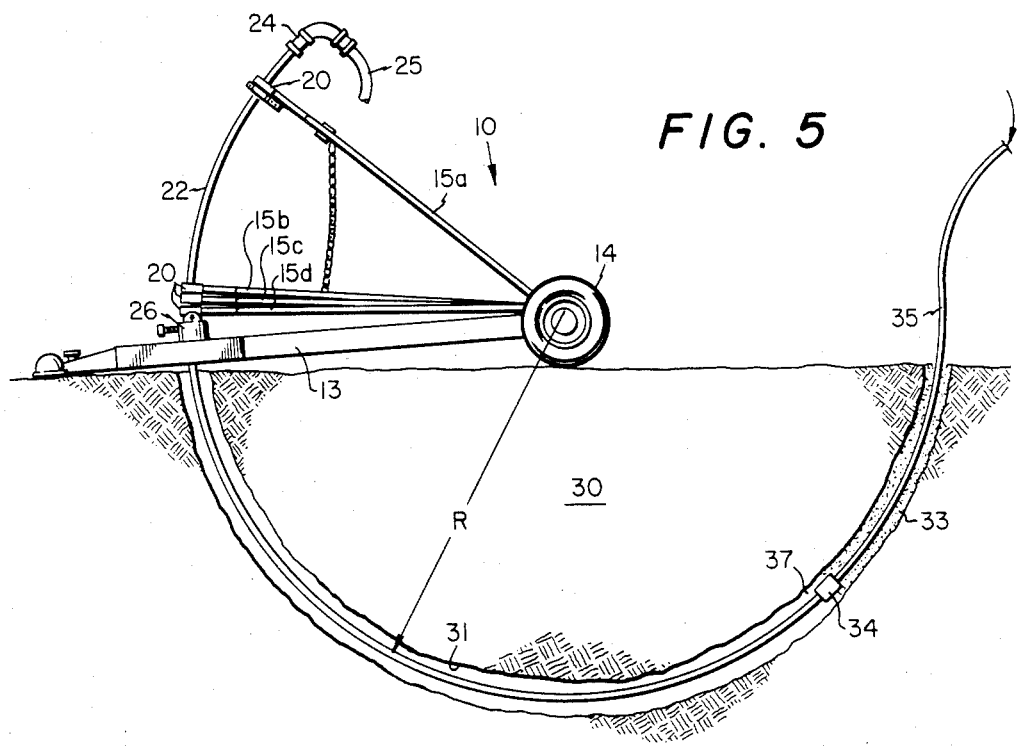
FIG. 5 is an elevational view, partly in section of the apparatus of FIG. 1 in an intermediate position of casing a drilled hole.

Apparatus 10 is positioned on the site on which a first hole is to be drilled in the earth 30 (FIG. 5). Drill pipe 22 is in the position shown in FIG. 1. Hose 25 is connected to a pump or the like and fluid, e.g. water, is supplied under pressure to and through pipe 22. Bolt 27 is retracted to free pipe 22 in guide 26. When the pressure of the fluid is at the desired level, an operator grips pipe 22 at a point between supports 15c and 15d and forces it downward into earth 30. As pipe 22 is forced into earth 30, the pressurized fluid exiting from the leading end of pipe 22 cuts a hole ahead of the advancing pipe 22 with the removed earth being flushed upward around the pipe and out to the surface. Pipe 22 will move freely through guides 20 on supports 15b, 15c, 15d as it is forced into earth 30 while support 15a pivots to move with pipe 22. When support 15a contacts 15b, support 15b is then rotated by and is carried forward with support 15a. Likewise, supports 15c and 15d, respectively, will rotate upon contact by the advancing supports until all supports 15 are stacked on tongue 13 (FIG. 5). When all of pipe 22 has been fed into earth 30, the leading end of pipe 22 will break through the surface and the drilling of hole 31 (FIG. 5) is completed. The actual diameter of hole 31 is shown exaggerated in the drawings for the sake of clarity in description.

In the use of apparatus 10, tests indicate that in most soil conditions normally expected to be encountered, no bit or equivalent structure will be required at the leading end of drill pipe 22. However, it should be understood, that if needed due to extreme soil conditions, a restrictive structure, e.g. jet bit (not shown) can be provided on pipe 22 to increase the drilling efficiency of apparatus 10. Further, in hard rock type soils, a drill bit (not shown) can be provided at the leading end of pipe 22 which is driven by a motor at the trailing end of pipe 22 through a flexible drive shaft which extends through pipe 22, e.g. see U.S. Pat. Nos. 3,720,272 and 4,062,196.

Actual tests have further shown that apparatus 10 is capable of rapidly drilling a hole having a substantially constant radius of curvature in a typical consolidated earth formation with water under 200 psi pressure or lower. For example, a hole was drilled using a ½ inch O.D. pipe 22 having an 8 foot radius of curvature in approximately 10 minutes using only water at a pressure around 200 psi. However, it is expected that pressures normally will be maintained in the 600–800 psi range for most operations, these pressures easily being maintained with relatively inexpensive commercially-available equipment.

In forming or installing a heat exchange system 32 (FIG. 8) in the earth 30 in accordance with the present invention, hole 31 having a substantially constant radius of curvature R (FIG. 5) is drilled as described above. When the leading end of drill pipe 22 breaks through the surface, the flow of pressurized fluid is stopped and an adaptor 34 (FIG. 7) is used to attach the leading end of pipe 22 to one end of a flexible conduit or casing 35. Casing 35 can be of any good heat conductive, noncorrosive material (e.g. PVC tubing, copper tubing or the like) and is of a length sufficient to extend completely through hole 31 and out both ends thereof. The other end of casing 35 is connected to a source of particulate, heat conductive material 33, (e.g. sand, aluminum particles or shavings, steel shot or shavings, and the like).

With casing 35 connected to drill pipe 22 through adaptor 34, drill pipe 22 is withdrawn by an operator who pulls it back through hole 31. As pipe 22 is withdrawn and casing 35 is pulled thereby into hole 31, particulate, heat conductive material is pumped through casing 35 and out ports 36 in adaptor 34 to backfill the annulus 37 which is formed between hole 31 and casing 35 as it is pulled into hole 31. When drill pipe 22 is fully withdrawn, hole 31 will be completely cased and ready for use. Apparatus 10 is then moved to another location and additional holes are drilled and cased to provide a plurality of holes for the heat exchange system 32 (FIG. 8), 32a (FIG. 6A), or 32b (FIG. 6B).

FIG. 8 shows a typical air conditioning system 40 utilizing a heat exchange system 32 formed in accordance with the present invention. As understood, a fluid (e.g. Freon) is compressed to a liquid by compressor 41 and then is normally expanded to gas in unit 42 to produce cooling for air that is passed therethrough. The Freon gas is then passed back through compressor 41 to complete the cycle. As known, the heat generated by the compression of a gas is substantial and directly affects the efficiency of an air conditioner. As shown in FIG. 8, the Freon liquid exiting from compressor 41 is passed through heat exchanger 44 where it is cooled by fluid, e.g. water, which, in turn, is pumped through heat exchange system 32. The water picks up heat from the Freon and the heated water is then cooled by heat exchange with earth 30. By removing heat from the Freon liquid, it reaches a lower temperature upon expansion to substantially improve the efficiency of the air conditioning system. Of course, when air conditioning system 40 is to be used to heat instead of cool, the operation is reversed and heat will be taken from earth 30 to aid in heating the fluid in system 40.

FIGS. 6A and 6B are plan views of typical patterns in which holes 31 can be laid out in earth 30 to form a heat exchange system. In FIG. 6A, holes 31 are laid out substantially parallel to each other with each having an inlet 31a and an outlet 31b. Inlet 31a of a first hole serves as inlet for heat exchange system 32 while the outlet 31b of the last hole serves as outlet of the system. The other outlets 31b are connected by means of conduits 31c to inlets 31a of a respective adjacent hole so that a continuous flowpath is formed through heat exchange system 32. In FIG. 6B, holes 31 are laid out on the radii of a common circle with all inlets 31a being connected together by a manifold 31d and all outlets 31b connected together by a manifold 31e so that fluid flowing through heat exchange system 32 takes parallel paths therethrough from inlet 31f to outlet 31g. Of course connections 31c (FIG. 6A) and manifolds 31d and 31e should be well insulated, preferably buried in trenches in the surface of earth 30. Further, it should be recognized that other patterns or connection paths can be used without departing from the present ivnention.

Although throughout the present description, drill pipe 22 has been described as a single length of curve pipe, it should be recognized that pipe 22 could also be formed in a plurality of curved sections and joined together by unions or like connectors as drilling progresses. This may be necessary for a drill pipe having an extremely large radius of curvature or where the drilling operation is to be carried out under an overhanging obstacle. Further, in some instances, hole 31 may be cased by merely leaving drill pipe 22 in place after drilling has been completed. Still further, where the annulus is filled with a particulate material, it may become desirable to occasionally saturate this material with a heat conductive liquid, e.g. water, to insure a good heat exchange path between the casing and the earth. This can be done by merely supplying water to the material in the annulus at either or both ends of hole 31 and letting it percolate downward through the material or a perforated tubing or hose can be attached to the outside of the casing and be installed therewith through which water can be added throughout the material.

Also, the supports 15 can be made to be adjustable (e.g. guide means 19 can be secured in different positions) to change the effective lengths of supports 15 to thereby allow a single apparatus to accommodate drill pipes 22 of different radii of curvature. Still further, a separate feeding mechanism (not shown) e.g. jacks or a pull-down cable, can be provided on frame 11 to positively feed drill pipe into the earth during drilling and to withdraw the pipe during the casing operation.

What is claimed is:

1. A method for forming a heat exchange system in the earth comprising:
    (a) drilling a curved hole in the earth, the longitudinal axis of said hole lying along and defining an arc which, in turn, has a substantially constant radius of curvature whereby both ends of said curved hole open through the surface at spaced points from each other;
    (b) casing the entire length of said curved hole with a conduit to provide a cased flowpath completely through said hole.

2. The method of claim 1 wherein said step of casing said curved hole is carried out after the step of drilling of said hole has been completed.

3. The method of claims 1 or 2 including:
    filling an annulus formed between said hole and said casing with a heat conductive material.

4. The method of claim 3 wherein said heat conductive material is particulate material.

5. The method of claim 4 wherein said particulate material is sand.

6. The method of claim 4 including:
    saturating said particulate material with a heat conductive liquid.

7. The method of claim 1 or 2 including:

drilling and casing a plurality of curved holes in close proximity to each other, the ends of each hole functioning as an inlet and an outlet, respectively, for each said hole, said inlet of a first of said holes being the inlet of said heat exchange system and the outlet of the last of said holes being the outlet of said heat exchange system, and connecting the outlet of said first hole and of each of the other of said plurality of holes to the inlet of a respective adjacent hole to connect all of said plurality of holes in series to thereby provide a continuous flowpath from the inlet of said first hole to the outlet of said last hole.

8. The method of claims 1 or 2 including:

drilling and casing a plurality of curved holes in a radial pattern, each of said holes having an inlet and an outlet which both lie on a radius of a common circle, each of said holes lying along a different radii of said common circle;

connecting all of said inlets of said holes together and to the inlet of said heat exchange system, and connecting all of said outlets of said holes together and to the outlet of said heat exchange system thereby connecting said holes together in parallel to provide a plurality of continuous flowpaths therethrough from said inlet of said heat exchange system to said outlet thereof.

9. A method for forming a heat exchange system in the earth comprising:

drilling a curved hole having a substantially constant radius of curvature by feeding a similarly curved drill pipe into the earth until the leading end of said drill pipe completes the curved hole and breaks through the surface of said earth at a point spaced from where it entered said earth;

attaching a conduit to the leading end of said drill pipe; and withdrawing said drill pipe back through the drilled hole thereby pulling said conduit therewith to case said drilled hole.

10. The method of claim 9 including:

forcing fluid under pressure through said drill pipe and out its leading end as said drill pipe is being fed through said earth.

11. The method of claim 10 wherein said fluid is water.

12. The method of claim 10 including:

filling an annulus formed between said hole and said conduit with particulate heat conductive material as said drill pipe is being withdrawn and the conduit is being drawn into said hole.

13. The method of claim 12 wherein said particulate material is fed through said conduit as it is drawn through said hole by the drill pipe.

14. The method of claim 12 wherein said particulate material is sand.

15. The method of claim 12 wherein said particulate material is aluminum.

16. A method for forming a heat exchange system in the earth comprising:

(a) forming a hole in said earth;

(b) placing a conduit in said hole so that a space exists between said conduit and the sides of said hole;

(c) filling said space with a heat conductive, particulate material; and (d) saturatng said heat conductive, particulate material with a heat conductive liquid.

17. The method of claim 16 wherein said heat conductive, particulate material is sand.

18. The method of claim 17 wherein said heat conductive liquid is water.

* * * * *